United States Patent
Mamyshev et al.

[11] Patent Number: 6,011,638
[45] Date of Patent: Jan. 4, 2000

[54] DISPERSION TAPERED OPTICAL FIBERS FOR USE IN WDM SOLITON TRANSMISSION SYSTEMS

[75] Inventors: Pavel Viktorovich Mamyshev, Middletown; Linn Frederick Mollenauer, Colts Neck, both of N.J.

[73] Assignee: Lucent Technologies Inc., Murray Hill, N.J.

[21] Appl. No.: 08/599,831

[22] Filed: Feb. 12, 1996

[51] Int. Cl.[7] .................................................. H04B 10/16
[52] U.S. Cl. ........................ 359/179; 359/161; 385/123
[58] Field of Search ................................ 359/161, 173, 359/179, 124; 385/39, 43, 28, 123

[56] References Cited

U.S. PATENT DOCUMENTS

| | | | |
|---|---|---|---|
| 4,867,518 | 9/1989 | Stamnitz et al. | 359/341 |
| 4,913,507 | 4/1990 | Stamnitz et al. | 350/96.15 |
| 4,941,726 | 7/1990 | Russell et al. | 359/334 |
| 5,117,303 | 5/1992 | Desurvire et al. | 359/341 |
| 5,504,819 | 4/1996 | Evans et al. | 385/123 |
| 5,523,874 | 6/1996 | Epworth | 359/161 |
| 5,559,910 | 9/1996 | Taga et al. | 385/24 |
| 5,579,428 | 11/1996 | Evans et al. | 385/124 |
| 5,613,027 | 3/1997 | Bhagavatula | 385/123 |
| 5,619,320 | 4/1997 | Eiselt et al. | 356/73.1 |

*Primary Examiner*—Rafael Bacares
*Attorney, Agent, or Firm*—Gibbons, Del Deo, Dolan, Griffinger & Vecchione

[57] ABSTRACT

A dispersion-tapered fiber for use in a soliton transmission system having lumped amplifiers to substantially reduce loss associated with pseudo phase matching and to relax the limitations on minimum allowable channel spacing caused by cross-phase modulation. The dispersion tapered fiber has a dispersion tapered either continuously or in steps, in conformity with the fiber loss curve.

17 Claims, 5 Drawing Sheets

6,011,638

DISPERSION TAPERED OPTICAL FIBERS FOR USE IN WDM SOLITON TRANSMISSION SYSTEMS

FIELD OF THE INVENTION

The present invention relates to optical communications systems, and more particularly to a soliton transmission system using optical fibers.

BACKGROUND OF THE INVENTION

An optical fiber is a filament made of dielectric material to guide light. As such, optical fibers can be used as a medium for transmitting information in the form of light energy. In fact, for those interested in transmitting large amounts of information in a short period of time, optical fibers provide many advantages over other communication mediums. For instance, optical fibers made from silica glass provide very small transmission losses, have a greater bandwidth than any other transmission medium known today, and are immune to electromagnetic interference.

In transmitting information over long distances through such optical fibers, however, the optical signal tends to degrade from the effect of chromatic dispersion. That is, the various frequency components of the optical signal have slightly different velocities as the signal travels down the fiber causing each pulse to spread in time.

This problem was partially solved with the advent of the soliton. Solitons are pulses of light that maintain their shape over long distances. Light pulses that travel as solitons can travel much farther along an optical fiber before experiencing dispersive broadening. The soliton holds its shape because the passage of light through the fiber temporarily decreases the speed of light in that part of the fiber. That is, the soliton has the correct amplitude and shape sech(t) such that this nonlinear property can exactly compensate for the temporal spreading due to chromatic dispersion.

The use of optical fibers in such high capacity transmission systems was further enhanced by incorporating wavelength division multiplexing (WDM) therein. WDM is a way of increasing the capacity of an optical fiber by simultaneously transmitting more than one wavelength over the same fiber. Thus, with WDM, one can multiplex signals by transmitting them at different wavelengths over the same fiber, and thus further increase the information throughput over a given time period.

Although WDM soliton transmission systems provide an effective way to increase the capacity of ultra-long distance data transmissions, they may still exhibit severe interchannel interference due to effects of the nonlinear property of the fiber. That is, solitons from different channels can interact through the non-linearity to shift each others optical frequencies and hence shift each others velocities, and to generate new and interfering optical signals through a process known as four wave mixing. Both of these effects can ultimately result in the generation of errors in the digital transmission.

It has been shown, however, that in a fiber having both constant dispersion and negligible loss, solitons of different wavelengths are transparent to each other. This transparency means that each soliton emerges from a mutual collision with wavelength, energy and shape unaltered. In particular, four-wave mixing (FWM) components that make a temporary appearance during the collision are reabsorbed by the solitons, thus maintaining the original shape of the soliton as it travels along the fiber.

It has been asserted that this transparency can be maintained in a system using a chain of lumped amplifiers, as long as the collision length (the distance the solitons travel down the fiber while passing through each other) is two or more times the amplifier spacing. Nevertheless, the analysis making this assertion was focused on the effect of cross-phase modulation between colliding solitons, and the generation of FWM components was assumed to be similar to the lossless case.

In a recent experimental study of soliton WDM transmission at 10 Gbit/s per channel, however, the WDM clearly involved serious penalties. In particular, the distance for error free transmissions were 35, 14, and 7 Mm, respectively, for 1, 2, and 3 channel transmissions. Thus, it was abundantly clear that the assertion of transparency between channels, described above, had overlooked an important effect.

The missing effect is the potential for uncontrolled growth of FWM, due to pseudo phase matching from the periodic intensity fluctuations between amplifiers. Such uncontrolled growth of the FWM imposes penalties on the transmission by two different mechanisms. First, since the energy represented by the FWM fields is not reabsorbed by the solitons, the solitons tend to lose energy with each collision. Since the net energy loss of a given soliton depends on the number of collisions it has suffered, and upon the addition of FWM fields with essentially random phases, it directly creates amplitude jitter. The energy loss leads to timing jitter as well, both through the intimate coupling between amplitude and frequency inherent in filtered systems, and through its tendency to asymmetrize the collision, and hence to induce net velocity shifts. Thus, even in a two channel WDM, there can be serious penalties (see FIG. 1).

Moreover, if the wavelengths of the FWM products coincide with the wavelengths of other WDM channels (possibly only when there exists three or more channels), the run-away FWM becomes an additional source of noise fields to act on those channels. In that way, the well known amplitude and timing jitter effects of spontaneous emission are enhanced. As a result, in WDM soliton transmission systems having lumped amplifiers, constant dispersion fibers fail to compensate for nonlinear effects of the fiber on the traveling signal, and thus have substantial transmission loss.

SUMMARY OF THE INVENTION

Accordingly, the present invention is directed to the implementation of a fiber medium in a WDM soliton transmission system having lumped amplifiers that substantially minimizes losses due to the nonlinear effects (the FWM fields or products from soliton-soliton collisions) of the fiber on the transmitted signals. To attain this, the present invention implements a dispersion tapered fiber as the communication medium in the WDM soliton transmission system having lumped amplifiers.

The growth of FWM products in a WDM soliton transmission system can be effectively eliminated through proper dispersion management. In one embodiment of the present invention, the fiber dispersion is tapered such that it decreases exponentially with distance exactly as does the signal energy. Although such dispersion-tapered fiber may not be commercially available, such a tapered fiber would completely eliminate such FWM product losses.

In another embodiment, the fiber is step-wise tapered as an approximation to the exponential taper as described above. In such a step-wise tapering, losses due to pseudo-phase matching can be substantially minimized. Thus, the present invention overcomes, to a large extent, the limitations associated with the prior art.

These and other features of the invention are described in more complete detail in the following detailed description of the invention when taken with the drawings. The scope of the invention, however, is limited only by the claims appended hereto.

DETAILED DESCRIPTION OF VARIOUS ILLUSTRATIVE EMBODIMENTS

Figure 1:
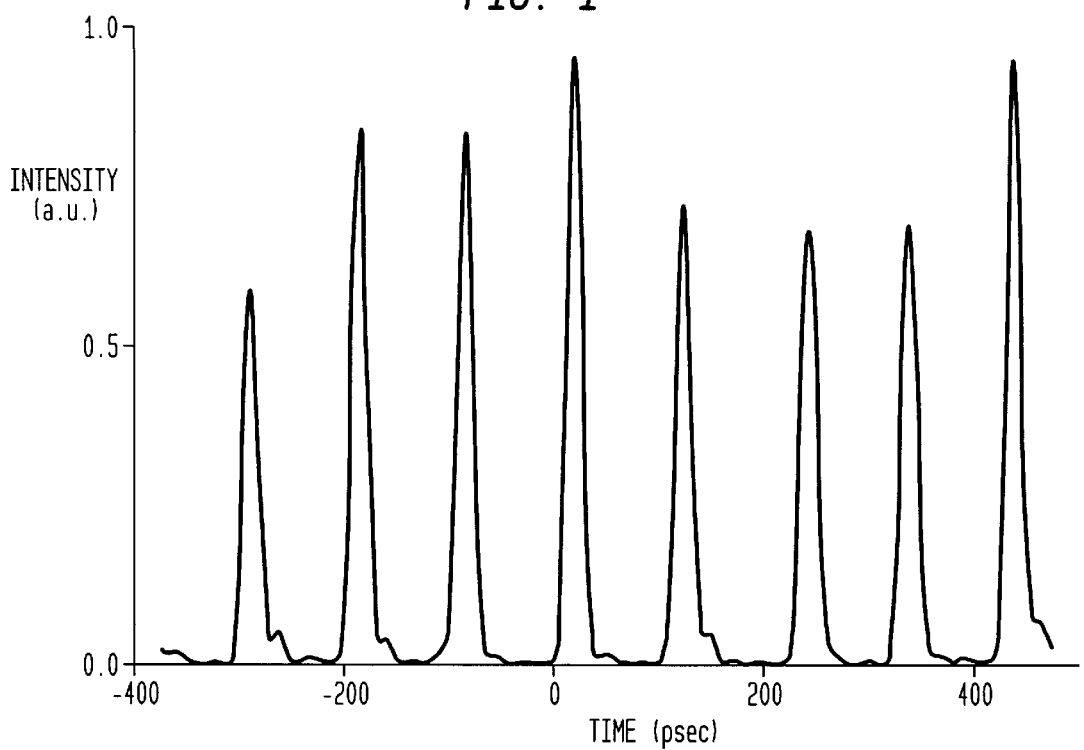
FIG. 1 is a graphical view of the timing and amplitude jitter due to FWM fields from successive collisions of soliton pulses 0.6 nm away that have traversed a 10 Mm transmission line with $L_{amp}$=33 km and constant D=0.5 ps/nm-km.

When two waves at frequencies $\omega_1$ and $\omega_2 = \omega_1 + \Delta\omega$ interact with each other in a fiber, new spectral components at $\omega_s = \omega_1 - \Delta\omega$ and $\omega_a = \omega_2 + \Delta\omega$ are generated through the following FWM processes:

$$\omega_1 + \omega_2 \rightarrow \omega_s + \omega_a \quad (1a)$$

$$\omega_1 + \omega_1 \rightarrow \omega_2 + \omega_s \quad (1b)$$

$$\omega_2 + \omega_2 \rightarrow \omega_1 + \omega_a \quad (1c)$$

For a simple, two soliton collision, process 1b and 1c are dominant, since three of the fields involved there are initially non-zero. For these processes the phase mismatch is $$\Delta k = (k_2 + k_s - k_1 - k_1 \text{ or } k_1 + k_a - k_2 - k_2) \quad (2)$$

$$= \frac{\delta^2 k}{\delta \omega^2} \Delta\omega^2 = -\frac{\lambda^2 D}{2\pi c} \Delta\omega^2$$

and when the fields at $\omega_1$ and $\omega_2$ are continuos waves, the FWM products grow as $$\frac{dE_i}{dz} \propto E_j^2 E_k^* \exp(i \Delta k z) \quad (3)$$

where the set of subscripts i,j,k on the field quantities E is either s,1,2 (process 1b) or a,1,2 (process 1c), and z is the distance along the fiber. Note that the phase of the generated product is periodic in z, with period $L_{res}=2\pi/\Delta k$, due to the phase mismatch. For a lossless fiber with constant dispersion (i.e., where $E_{1,2}(z)$=const and $\Delta k$=const), Eq.(3) is readily integrated to yield $$E_i(z) \propto \frac{E_j^2 E_k^*}{i\Delta k} [\exp(i \Delta k z) - 1] \quad (4)$$

a field that merely oscillates between zero and a fixed maximum, and never grows.

Nevertheless, if the transmission line has periodic perturbations with $k_{pert}$ in resonance with the phase mismatch of the FWM, i.e., when $$N k_{pert} = \Delta k, (N=1,2,3, \ldots) \quad (5)$$

then one has pseudo phase matching, and the FWM product can grow steadily. The perturbations can correspond to the gain/loss cycle whose period is the amplifier spacing, $L_{amp}$, and/or to periodic variations of the fiber parameters (dispersion, mode area). For the case of lumped amplifiers, $k_{pert}=2\pi/L_{amp}$, and the quasi-phase-matching conditions are met when $$L_{amp}=N L_{res}=2\pi N/\Delta k \quad (6)$$

Figure 2:
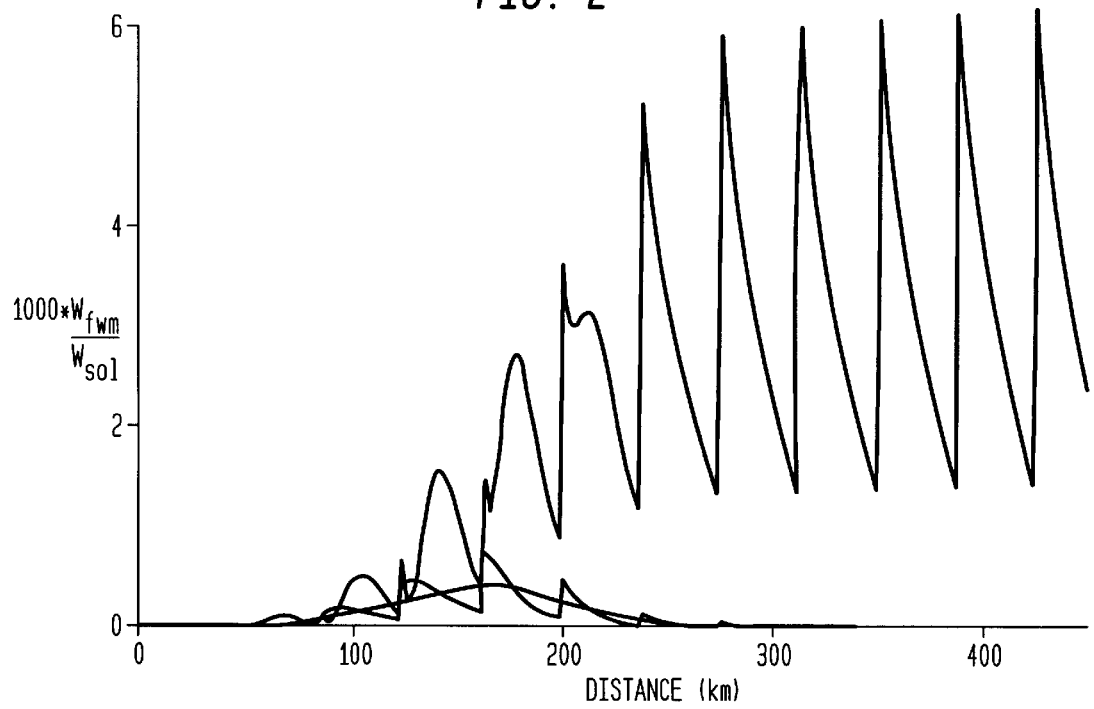
FIG. 2 shows a graphical view of the growth of FWM energy during a single soliton-soliton collision for three different conditions: (1) a lossless fiber with constant dispersion (small smooth curve), (2) a real fiber with lumped amplifiers spaced 33.3 km having exponentially tapered dispersion (small jagged curve), and (3) a real fiber with lumped amplifiers spaced 33.3 km and constant dispersion (large jagged curve)

Although FWM generation during a soliton-soliton collision is more complicated than with continues waves, the basic features remain the same. FIG. 2 shows the numerically simulated growth in energy of the FWM products at $\omega_{a,s}$ during a single collision of two solitons. [The particular parameters represented are those of our experiments, viz., pulse FWHM $\tau$=20 psec, adjust channel separation $\Delta\omega/2\pi$= 75 Ghz ($\Delta\lambda$=0.6 nm at $\lambda$=1556 nm), and where the path-average dispersion $\overline{D}$=0.5 psec/nm/km.] For these parameters, $L_{res}$=44.4 km, while the collision length $L_{coll}=2\tau/(D\Delta\lambda)$=133 km. Note that for the case of lossless fiber of constant dispersion, and for the case of real fiber with exponentially tapered dispersion, the FWM energy disappears completely following the collision. Also note that due to the fact that the solitons have finite temporal and spectral envelopes, and due to the effect of cross phase modulation (which shifts the pulses carrier frequencies during the collision) the oscillations of the FWM energy with the period of $L_{res}$ are almost completely washed out. Finally, for the case of real fiber with constant dispersion, note that the collision produces a residual FWM energy several times larger than the (temporal) peak obtaining with lossless fiber.

Figure 3:
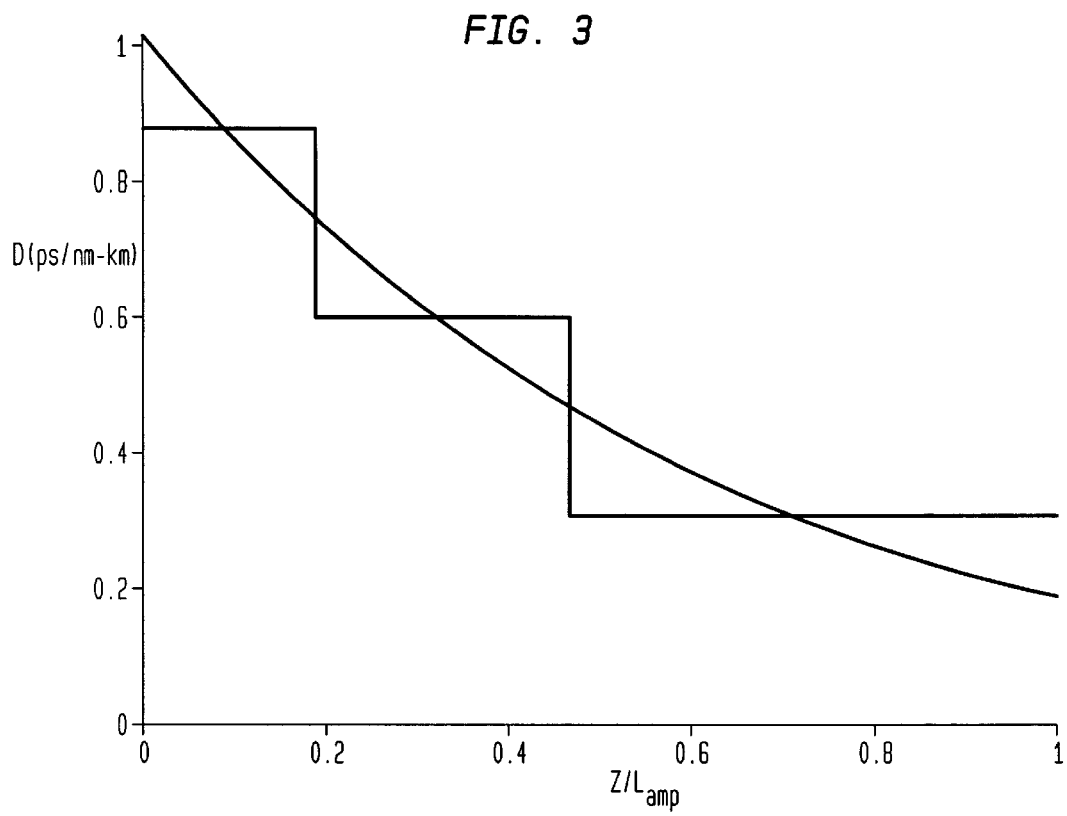
FIG. 3 is a graphical view of the ideal exponential taper of D, and the best 3-step approximation to the ideal taper for a fiber span with $L_{amp}$=33.3 km and a loss rate of 0.21 dB/km.

The best step-wise approximations to exponentially tapered D are obtained when the condition $D_{step} \times L_{step}$= const. is satisfied. Note that this condition makes the steps have equal lengths as measured in soliton units. In that case, the locus of the FWM product $E_i$, when plotted as a vector in the complex plane, is a nearly closed loop as $\Delta k z$ ranges from 0 to $2\pi$. FIG. 3 illustrates this scheme for the case of a three step approximation.

Figure 4:
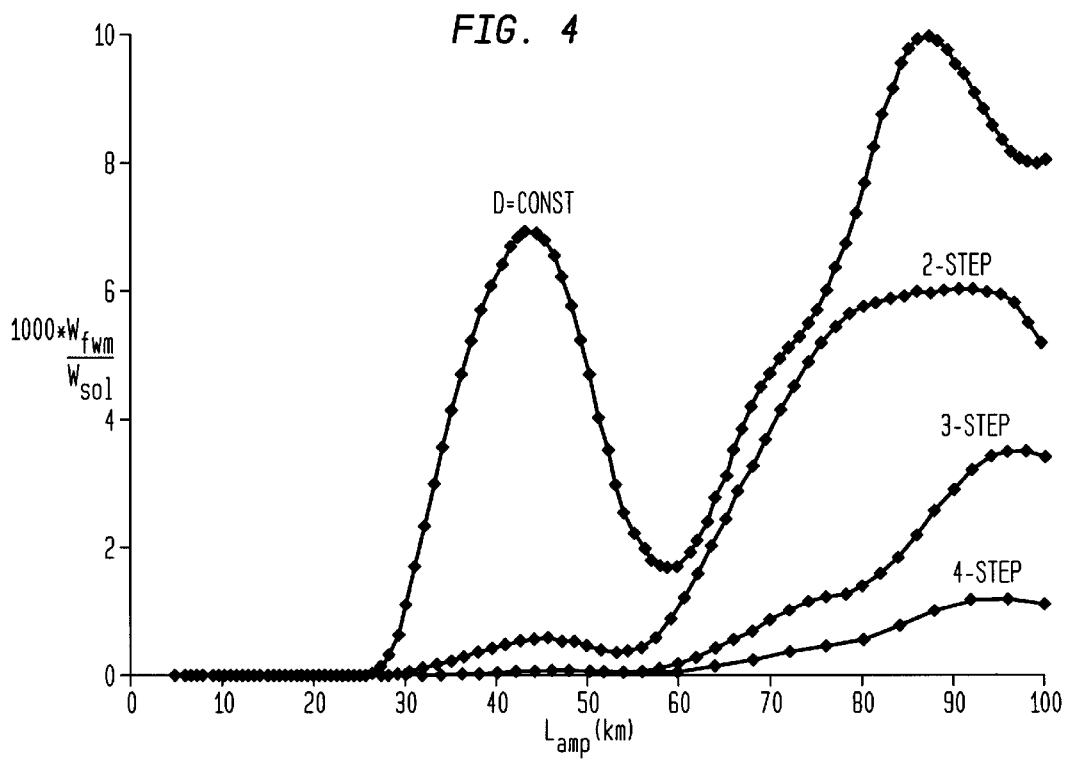
FIG. 4 is a graphical view of the FWM energy for a single collision as a function of the amplifier spacing for constant D, and for 2, 3, and 4-step approximations of the ideal exponential taper shown in FIG. 3.
Figure 5:
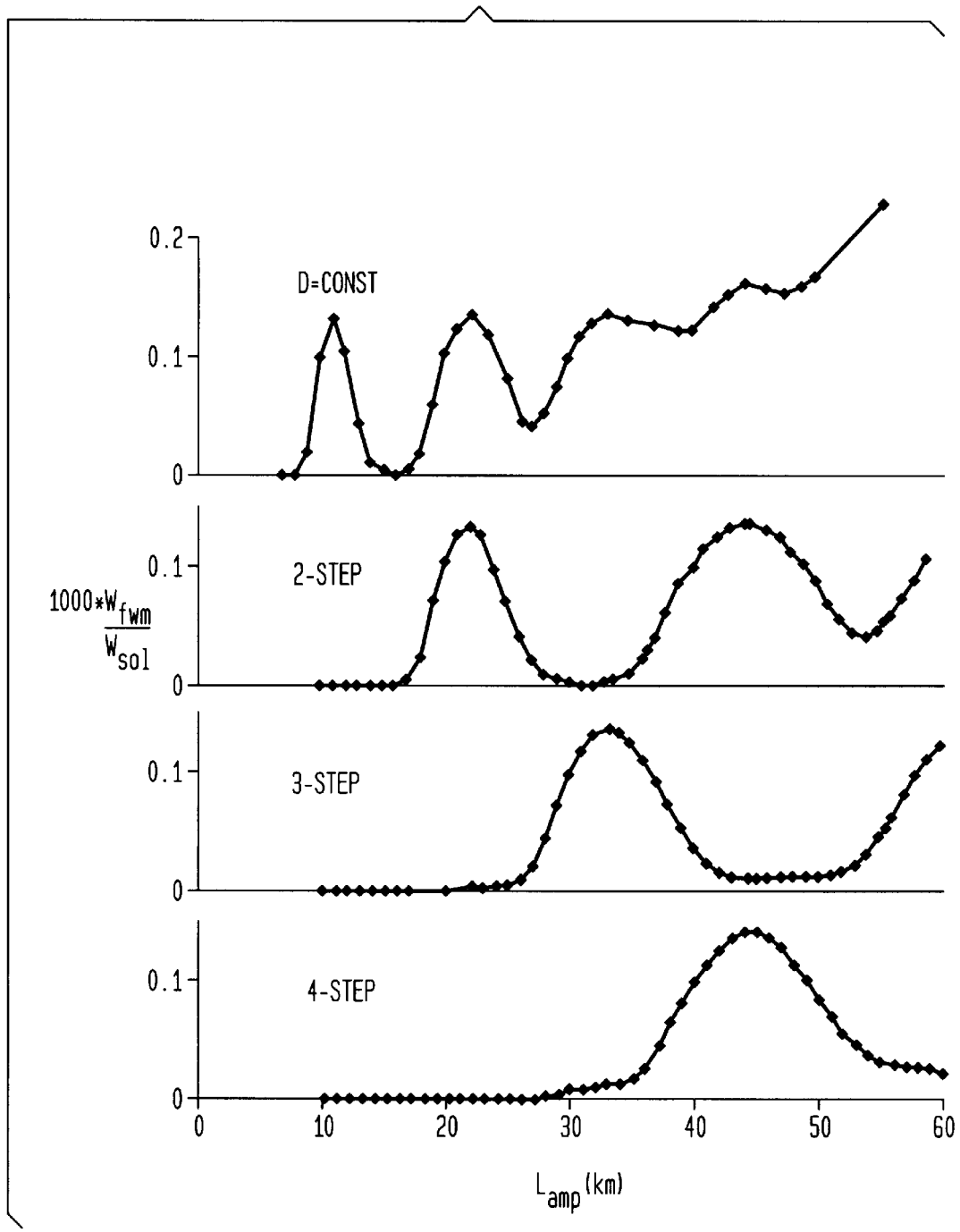
FIG. 5 is a graphical view of the FWM energy for a single collision, as shown in FIG. 4, with a channel spacing that is twice as great as that shown in FIG. 4.

FIG. 4 plots the residual FWM intensity resulting from a single collision, as a function of $L_{amp}$, for various numbers of steps in D per $L_{amp}$, for the channel separation of 0.6 nm, and for the τ=20 ps solitons and $\overline{D}$=0.5 ps/nm-km of FIG. 2. FIG. 5 does the same, but for twice the channel separation (1.2 nm). First, note that the intensity scale in FIG. 4 is approximately a factor of $2^5$=32 times that of FIG. 5, just as implied by Eqns. (2) and (4), and by the fact that $L_{coll}$ scales inversely as the channel spacing. This scaling is easily generalized; for channels spaced n times the adjacent channel spacing, the FWM intensity should scale as $n^{-5}$. This apparently rapid falloff in FWM effect is tempered somewhat by the fact that the number of collisions tends to increase as n, and that it is really the vector addition of residual field quantities from at least several successive collisions that is to be feared here. Also note that the number of steps required for total suppression of the FWM intensity increases with increasing channel spacing. For example, in FIG. 4, just two steps are required for $L_{amp}$ in the neighborhood of 30 km, while four steps are required for the same in FIG. 5. Finally, note that because of the finite nature of the pulse widths and collision lengths, the resonance in FIG.'s 4 and 5 are fairly broad.

The use of dispersion tapered fiber was originally conceived to enable distortionless soliton transmission in the face of fiber loss. Its manufacture and use has also been demonstrated. In particular, it has been implied that such dispersion tapered fiber could be used in single channel transmissions at extremely high bit rates. In this work we have shown that dispersion tapered fiber is equally important, if not more so, for the achievement of massive WDM with solitons. It is also important to note that even with the use of dispersion tapered fiber, there remain formidable difficulties for the attainment of ultra-high bit rates in a single channel, while the remaining defects with WDM are almost certainly more benign and manageable. Finally, we note that the dispersion management we advocate herein relaxes the requirement $L_{coll} \geq 2L_{amp}$, to avoid the penalty from affects of cross-phase modulation. The requirement becomes $L_{coll} \geq 2L_{step}$, where $L_{step}$ is the dispersion step length, and where both quantities are measured in soliton units. Thus, for the ideal exponential taper, the requirement vanishes altogether.

Figure 6:
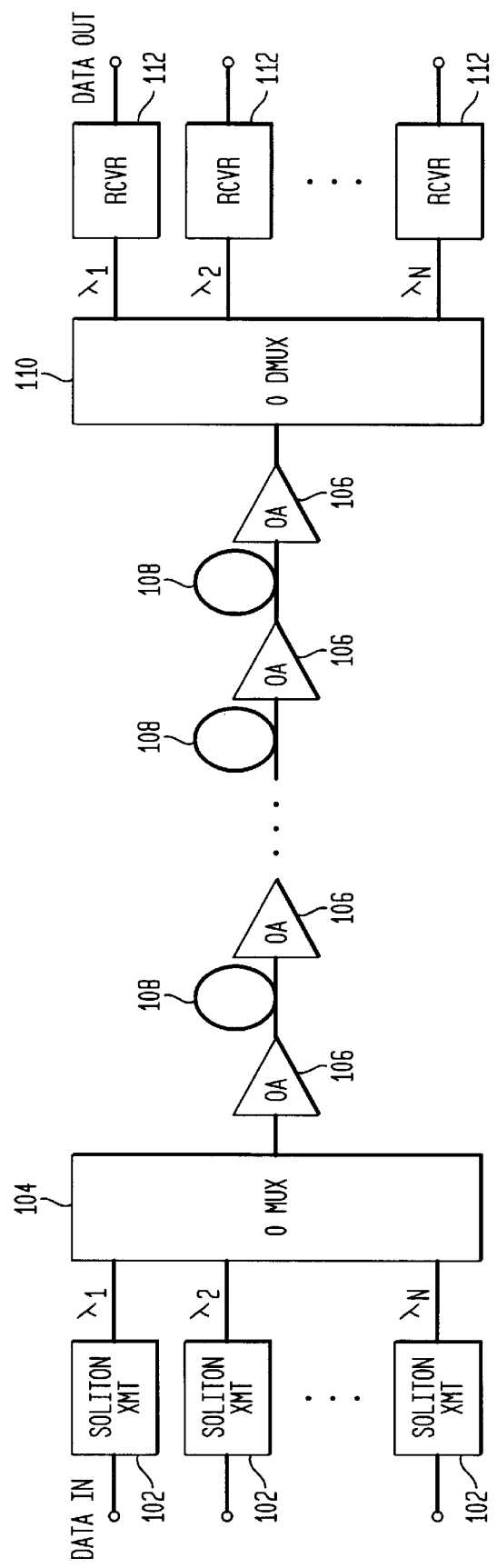
FIG. 6 is a block diagram of a Soliton WDM transmission system which employs the present invention.

Referring to FIG. 6 there is shown a block diagram of a Soliton WDM transmission system which employs the present invention dispersion-taper fiber. Soliton transmitters 102 for the WDM channels which operate at optical frequencies $\lambda_1$ through $\lambda_n$ are optically coupled to an optical multiplexer 104. The output of the optical multiplexer 104 is coupled an optical amplifier (lumped optical amplifier) 106. The output of the optical amplifier 106 is optically coupled to a first end of a dispersion-taper fiber 108. A second end of the dispersion-taper fiber 108 is optically coupled to the input of an optical amplifier 106. Additional spans of dispersion-taper fiber 108 and optical amplifiers 106 are optically coupled in series as necessary. The output of the last optical amplifier 106 is optically coupled to an optical demultiplexer 110. The outputs of the demultiplexer 110 are coupled to corresponding optical receivers for the WDM channels.

Figure 7A:
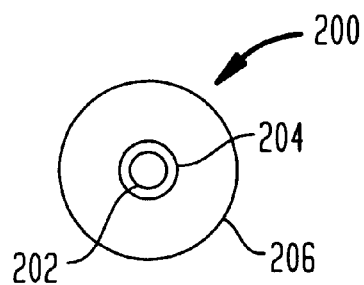
FIGS. 7A and 7B are cross sections of a typical tapered fiber device.
Figure 7B:
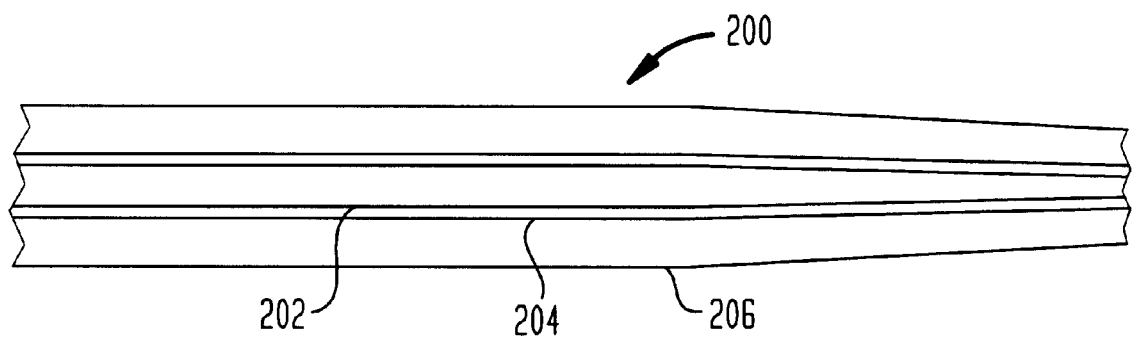

Referring to FIGS. 7A and 7B there are shown cross sections of a typical tapered fiber device. The tapered fiber device is essentially a multiclad single mode optical fiber 200 comprising an inner core 202 having a relatively high index of refraction surrounded by a plurality of cladding layers 204 and 206, having relatively lower indices of refraction as compared to the core. In accordance with principles well known in the art, the fiber is dimensioned for single mode operation. FIG. 7B shows a longitudinal cross section of the typical tapered fiber device. The fiber can be tapered by heating it and stretching it along its longitudinal axis as well as by other means.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

For example, in the above description, the dispersion tapering of the fiber is described for a fiber having a constant effective cross sectional area. That is, the cross-sectional area of the fiber in which the signal extends while traveling through the fiber is constant. Thus, for a fiber having an effective area that varies with distance along the length of the fiber, the present invention provides that it is the product of the effective area and the dispersion of the fiber that must exhibit the desired dispersion tapering.

To illustrate, for the ideal exponentially tapered fiber having an effective area that varies along the length of the fiber, the product of the cross sectional area and the fiber dispersion must exponentially decrease along the length of the fiber in proportion to the change in signal strength, as described above.

What is claimed is:

1. A wavelength-division multiplexing soliton transmission system comprising:

a wavelength-division multiplexing transmitter for transmitting solitons;

at least two lumped optical amplifiers, wherein one of said at least two lumped amplifiers is coupled to said wavelength-division multiplexing transmitter;

a dispersion tapered fiber to substantially minimize signal losses due to pseudo phase matching and to relax the limitations on minimum allowable channel spacing caused by cross phase modulation, said dispersion taper fiber coupled between said one of said at least two lumped optical amplifiers and another of said at least two lumped amplifiers; and a wavelength-division multiplexing receiver for receiving solitons coupled to said another of said at least two lumped amplifiers.

2. The soliton transmission system of claim 1 wherein said dispersion tapered fiber is an exponentially tapered fiber.

3. The soliton transmission system of claim 2 wherein said exponentially tapered fiber has a first and a second end, and a fiber dispersion that decreases exponentially with distance from said first end to said second end in proportion to the change in signal energy therein, wherein said first end is proximal to said wavelength-division multiplexing transmitter.

4. The soliton transmission system of claim 1 wherein said fiber is a continuously tapered fiber.

5. The soliton transmission system of claim 1 wherein said fiber is a step-tapered fiber having a first and a second end.

6. The soliton transmission system of claim 5 wherein said step tapered fiber has a fiber dispersion that decreases from said first end to said second end substantially in proportion to the change in signal strength therein, wherein said first end is proximal to said wavelength-division multiplexing transmitter.

7. The soliton transmission system of claim 6 wherein said step tapered fiber has a fiber dispersion that decreases from said first end to said second end substantially in proportion to the change in signal strength therein.

8. A method of substantially minimizing loss due to pseudo phase matching in a wavelength division multiplexing soliton transmission system having lumped amplifiers, said method comprising the step of implementing a low loss communication medium comprising a dispersion tapered fiber.

9. An improved wavelength-division multiplexing soliton transmission system of the type having lumped amplifiers, wherein the improvement comprises a dispersion tapered fiber to substantially minimize signal losses due to pseudo phase matching.

10. The improved soliton transmission system of claim 9 wherein said dispersion tapered fiber is an exponentially tapered fiber.

11. The improved soliton transmission system of claim 10 wherein said exponentially tapered fiber has a first and a second end, and a fiber dispersion that decreases exponentially with distance from said first end to said second end in proportion to the signal energy therein.

12. The improved soliton transmission system of claim 9 wherein said fiber is a continuously tapered fiber.

13. The improved soliton transmission system of claim 9 wherein said fiber is a step-tapered fiber having a first and a second end.

14. The improved soliton transmission system of claim 13 wherein said step-tapered fiber has a fiber dispersion that decreases from said first end to said second end substantially in proportion to the change in signal strength therein.

15. The improved soliton transmission system of claim 9 wherein said exponentially dispersion tapered fiber has an intrinsic fiber loss curve to which said fiber is dispersion tapered in conformity therewith.

16. The improved soliton transmission system of claim 9 wherein the soliton has a signal energy that decreases with distance along said fiber, said fiber dispersion decreasing exponentially with distance in proportion to the change in signal strength therein.

17. The soliton transmission system of claim 1 wherein said dispersion tapered fiber has an effective core area, the product of said effective core area and a fiber dispersion changes in proportion to the change in signal strength therein.

* * * * *